P. H. McKENZIE.
CHAIN GRATE CONSTRUCTION.
APPLICATION FILED APR. 11, 1919.
1,376,449.
Patented May 3, 1921.
3 SHEETS—SHEET 1.
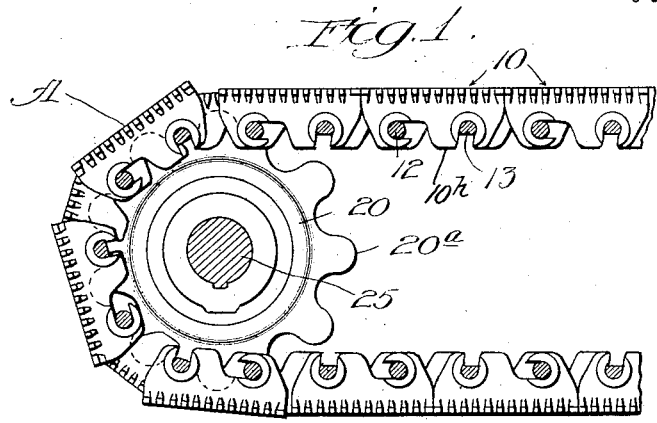
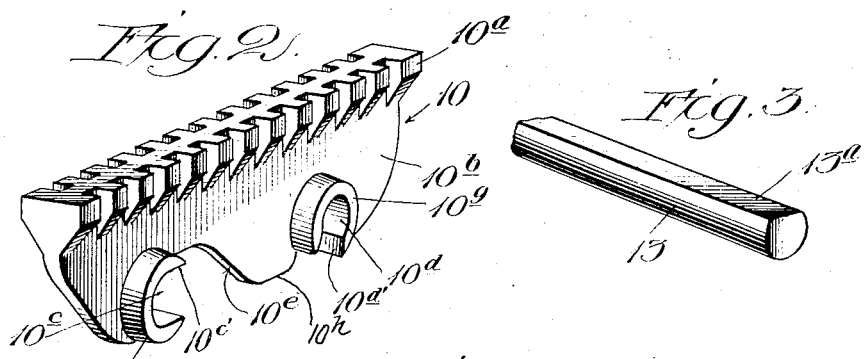
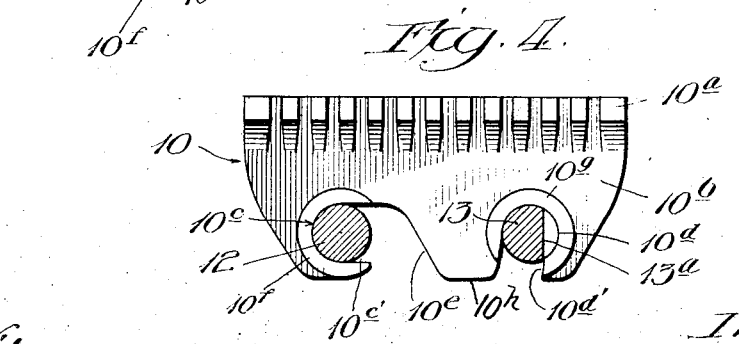
Witness:
Harry S. Guitar
Inventor:
Peter H. McKenzie
by Sheridan, Jones, Sheridan & Smith
Attys.

P. H. McKENZIE.
CHAIN GRATE CONSTRUCTION.
APPLICATION FILED APR. 11, 1919.
1,376,449.
Patented May 3, 1921.
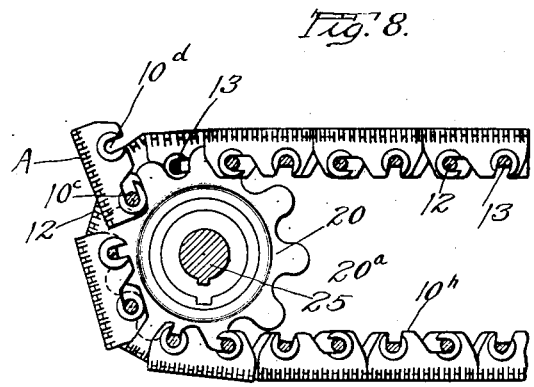
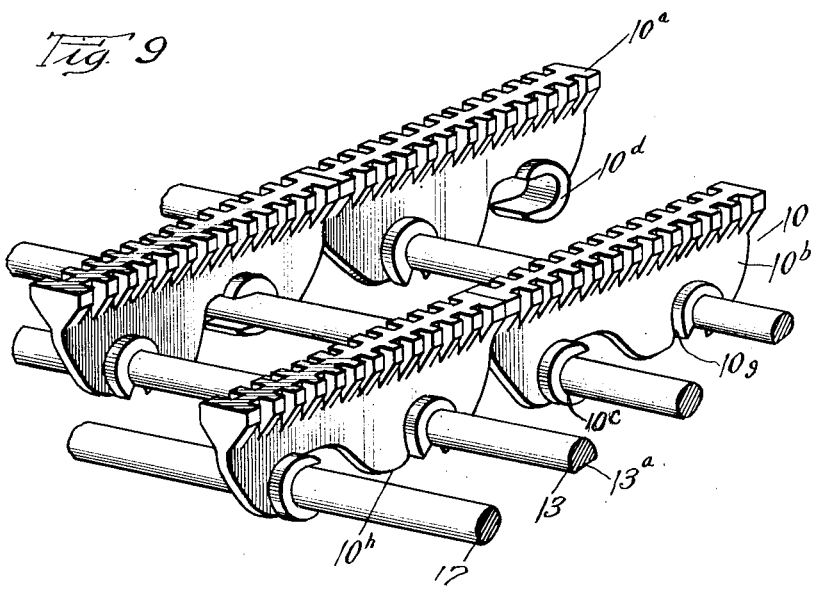

UNITED STATES PATENT OFFICE.

PETER H. McKENZIE, OF CHICAGO, ILLINOIS.

CHAIN-GRATE CONSTRUCTION.

1,376,449.  Specification of Letters Patent.  Patented May 3, 1921.

Application filed April 11, 1919. Serial No. 289,273.

*To all whom it may concern:*

Be it known that I, PETER H. McKENZIE, a citizen of the United States, residing at Chicago, in the county of Cook and State of Illinois, have invented certain new and useful Improvements in Chain-Grate Constructions, of which the following is a specification.

This invention relates to improvements in chain grate construction, and has for its object to provide for use in such construction a new and improved form of link and coacting rod structure which will permit ready removal or replacement without the necessity of disassembling the whole structure.

This and other objects of the invention will be more fully set forth and described in the following specification and shown in the accompanying drawings, in which—

Figure 1 is a side elevation of a chain grate embodying my invention, the supporting cross rods being shown in section for purposes of clearness.

Fig. 2 is a perspective view of one of the main link members;

Fig. 3 is a detail of one of the cross rods;

Fig. 4 is a side elevation of one of the links showing the supporting rods in section;

Fig. 8 is a side elevation of a portion of a chain grate embodying my invention, showing one of the links being removed; and Fig. 9 is a perspective disassembled view showing the staggered arrangement of adjacent links, the space between a pair of series of links being exaggerated for clearness.

Like numerals refer to like elements throughout the drawings, in which—

Figure 5:
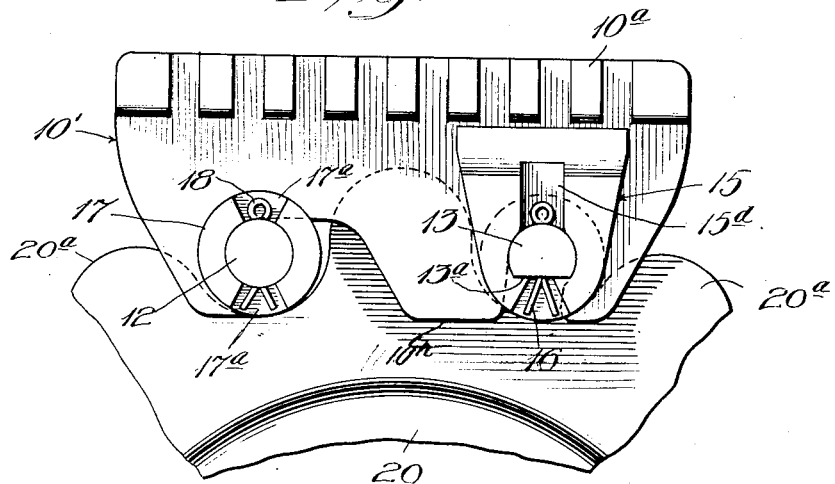
Fig. 5 is a side elevation showing the relation of a link, the ends of the supporting rods, and a portion of one of the driving sprockets.

10 indicates generally one of the links having grate portions $10^a$ at its fuel supporting face and a body portion $10^b$, the former overhanging, or projecting laterally, at each side of the body portion. Provided in the body portion are apertures $10^c$ and $10^d$, the former being provided with a coacting or slotted portion $10^{c'}$ extending longitudinally of the link 10 and then in effect downwardly, the latter being provided with a slot $10^{d'}$ directed toward the face of said link opposite the fuel supporting face and restricted in width relative to said aperture $10^d$,—see Figs. 2 and 4, for example. The body portion is further cut away, as indicated by the numeral $10^e$, rearwardly of the slot $10^{c'}$ as viewed in Fig. 4 for a purpose to be hereinafter described. Shoulders or flanges $10^f$ and $10^g$ project laterally of the body portion around the apertures $10^c$ and $10^d$, respectively, as shown, for example, in Fig. 2. These shoulders or flanges serve to maintain adjacent links in spaced relation to prevent interference of the grate portions of such links and to permit free advancement thereof. Between the ends of the slots $10^{c'}$ and $10^{d'}$ the link is flattened to form a flattened portion $10^h$. This gives an added bearing surface, where the links ride on any supporting surface or member, and decreases the possibility of the slots engaging edges, corners, or the like.

Extending transversely of the rail grate structure are the circular rods 12 and the rods 13, which are non-circular in contour, because provided with flattened portions $13^a$. These flattened portions permit of relative assembly or fitting together of the links and rods 13 with the rods in the aperture $10^d$, as shown in Fig. 4, the thickness of the rod at its smallest diameter being slightly less than the width of the slot $10^{d'}$. The arrangement of aperture $10^c$, slot $10^{d'}$, and cut-away portion $10^e$ of the links 10 permits the ready sliding of the links upon the circular rod 12, with the latter fitting in the apertures $10^c$ as shown in Fig. 4.

In assembling the structure, the rods 13 are rotated to the position shown in Fig. 4, and thereafter the links 10 are each slid on the circular rods 12 until the latter come to rest in the apertures $10^c$, when the links may be rotated downwardly from the position shown in Fig. 8 until the slots $10^{d'}$ pass over the rods 13 to the position shown in Fig. 4, when said rods will extend through the apertures $10^d$. Thereafter the rods may be partially rotated to bring the flattened portions out of alinement with the slots $10^{d'}$, when disassembly of the links and rods will be prevented, as is obvious.

Figure 6:
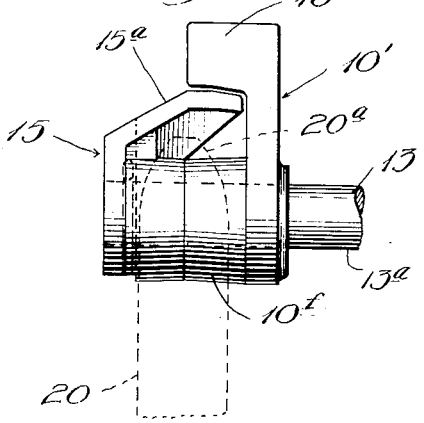
Fig. 6 is an end elevation of one of the links, together with the retaining cap, of a portion of the supporting rod.

To prevent accidental rotation of the rods 13 to the position shown in Fig. 4, I provide what I term collars 15—see Figs. 5 and 6—the latter being apertured to fit over the ends of said rods. These collars 15 are provided with a laterally projecting head portion 15ᵃ extending under the overhanging grate portion 10ᵃ of the adjacent link, thereby preventing any rotation of the rod 13 relative to the links 10 which would permit accidental disassembly of the links and rod. To maintain the collars 15 on the rods 13 I provide cotter pins 16, driven through suitable holes in the rods, the collars being provided with vertical slots or grooves 15ᵈ to permit driving in of suitable cotter pins.

It will be noted that the links which are located at the extreme side of the chain grate construction, which are designated 10′ in Fig. 6, for example, are provided with the grate portion 10ᵃ extending to one side only of the link. In these links the shoulders 10ᶠ project to one side a sufficient distance to coact with the main portion of the collars 15 to provide a bearing and contact surface for the teeth 20ᵃ of the driving sprocket 20, as indicated in dotted lines in Fig. 6.

The circular shafts 12 need no provision to prevent accidental rotation, since such rotation would have no effect upon the disassembly of the device. Consequently I only provide circular washer or collar members 17—see Fig. 5, for example—these members being provided with a cross slot or groove 17ᵃ which permits driving therethrough of the cotter pin 18, which, extending through a suitable aperture in the slot, will prevent displacement or removal of the washers. Reference to Fig. 5 will show the manner in which the teeth 20ᵃ of the sprocket 20 fit between each pair of the shafts, the shafts 12 and 13 being alternated in the chain grate structure.

Figure 7:
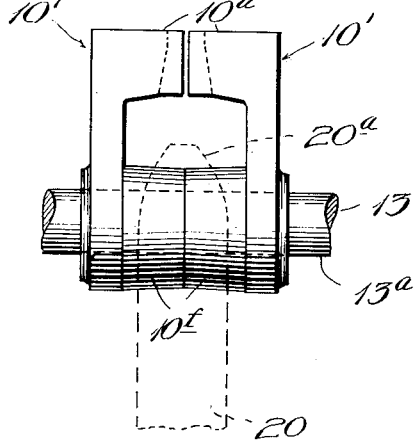
Fig. 7 is an end elevation of a pair of links of the type used to coact with the driving sprockets.

Since it is sometimes desirable to provide a plurality of sprockets on the drive shaft 25, in addition to those at each end thereof, I provide for such sprockets by utilizing pairs of adjacent links 10′ wherever such sprockets are located, as shown in Fig. 7. These links are provided with the collars or shoulders 10ᶠ and 10ᵍ of greater extension than in the ordinary links 10.

It will be apparent that with the alternation of the rods 12 with the rods 13 it will be necessary to locate one series of links, for example, in the manner shown in Figs. 1 and 4, while the series on either side thereof will be reversed, that is, with the apertures 10ᵈ located to the left of the apertures 10ᶜ.

It will further be apparent in the construction shown that in order to remove any of the links the chain grate will be rotated until such links are located on the curves of the sprockets in the position shown, for example, by the link designated A in Figs. 1 and 8, at which position, or in the position of the preceding link, after the rotation of the link about the circular rods 12 as an axis to the position of links A in Fig. 8, room is provided for slipping such link off the rod 12.

With my construction it will be apparent that in whichever direction the rods are traveling a pull will be exerted upon the links at the front end thereof and transmitted to the rod following. Alternate courses or series of links are arranged with the apertures 10ᶜ located toward the left, as shown in Fig. 9, for example, while intermediate courses or series of links are arranged with apertures 10ᵈ to the left, as shown in Fig. 9. Since the alternate of the transverse rods are flattened this results in a staggered arrangement of the links, i. e., the joints between adjacent links are staggered with respect to the joints between adjacent link courses on either side thereof.

It will be obvious that my invention is susceptible of numerous modifications and improvements; and I do not therefore desire to be restricted to the form shown, except as defined in the appended claims.

I claim:—

1. In combination, a plurality of transverse rods, alternate of said rods being circular in cross section and intermediate of said rods each having a flattened portion, links supported by said rods, each having a fuel supporting face, each of said links having an aperture adjacent one end thereof engaging one of said circular rods and a longitudinally directed slot leading from said aperture toward the other end of said link, said slot being open at its end to permit insertion of one of said rods from the face of said link opposite the fuel supporting face, said link being provided with a second aperture adjacent its other end, and a slot of reduced width leading from said second-named aperture to the face opposite the fuel supporting face of said link, said second-named aperture being in engagement with said flattened rods, said restricted slot permitting removal of the link from said rod only when said flattened portion is in alinement with said slot.

2. In combination, a plurality of transverse rods, alternate of said rods being circular in cross section and intermediate of said rods each having a flattened portion, links supported by said rods, each having a fuel supporting face, each of said links having an aperture adjacent one end thereof engaging one of said circular rods and a longitudinally directed slot leading from said aperture toward the other end of said link, said slot being open at its end to permit insertion of one of said rods from the face of said link opposite the fuel supporting face, said link being provided with a second aperture adjacent its other end, and a slot of reduced width leading from said second-named aperture to the face opposite the fuel supporting face of said link, said second-named aperture being in engagement with said flattened rods, said restricted slot permitting removal of the link from said rod only when said flattened portion is in alinement with said slot.

3. A link having a fuel supporting face and a substantially circular aperture adjacent one end, and a longitudinally directed slot leading from said aperture toward the other end of said link, said slot being open at its end to permit insertion of a supporting rod or the like from the face of said link opposite the fuel supporting face, said link being provided with a second aperture adjacent its other end substantially circular in periphery and a restricted slot leading from said second aperture to the face opposite said fuel supporting face.

4. A link having a fuel supporting face and a substantially circular aperture adjacent one end, and a longitudinally directed slot leading from said aperture toward the other end of said link, said slot being open at its end to permit insertion of a supporting rod or the like from the face of said link opposite the fuel supporting face, said link being provided with a second aperture adjacent its other end substantially circular in periphery and a restricted slot leading from said second aperture to the face opposite said fuel supporting face, said link being provided with a flat portion between the entrances to said slots.

5. In a structure of the class described, in combination, apertured links, a rod extending through the apertures in said links, and means to prevent relative rotation of said rod with respect to said links, said means comprising a collar member carried by said rod and engageable with one of said links.

6. In a structure of the class described, in combination, apertured links, a rod extending through the apertures in said links, and means to prevent relative rotation of said rod with respect to said links, said means comprising a collar member removably attached at the end of said rod and engageable with one of said links.

7. In a structure of the class described, in combination, an apertured link member, a rod extending through the aperture in said link member, said link member being provided with an overhanging portion, and a collar member carried by said rod, the said collar member being provided with a portion extending beneath said overhanging portion of said link to prevent relative rotation of said rod with respect to said link.

8. In a structure of the class described, in combination, an apertured link member, a rod extending through the aperture in said link member, said link member being provided with an overhanging portion, and a collar member carried by said rod, the said collar member being provided with a portion extending beneath said overhanging portion of said link to prevent relative rotation of said rod with respect to said link, said collar member being removably secured to said rod.

In testimony whereof, I have subscribed my name.

PETER H. McKENZIE.